United States Patent [19]
Connell

[11] 3,808,668
[45] May 7, 1974

[54] METHOD OF EMPLOYING A SOLUBLE MATRIX TO MAINTAIN A PLURALITY OF OBJECTS IN A FIXED RELATIONSHIP

[75] Inventor: Kenneth Percy Connell, San Diego, Calif.

[73] Assignee: The National Cash Register Company, Dayton, Ohio

[22] Filed: Mar. 9, 1972

[21] Appl. No.: 233,250

[52] U.S. Cl.................................. 29/423, 29/559
[51] Int. Cl............................................. B23q 7/00
[58] Field of Search............................ 29/423, 559

[56] References Cited
UNITED STATES PATENTS

| | | | |
|---|---|---|---|
| 3,358,362 | 12/1967 | McElroy | 29/423 UX |
| 3,648,350 | 3/1972 | Cassidy et al. | 29/423 |
| 3,122,827 | 3/1964 | Jepson | 29/423 |
| 3,672,032 | 6/1972 | Witherspoon | 29/559 X |
| 3,426,426 | 2/1969 | Born | 29/423 X |

Primary Examiner—Charles W. Lanham
Assistant Examiner—D. C. Reiley, III
Attorney, Agent, or Firm—J. T. Cavender; Lawrence P. Benjamin; James H. Phillips

[57] ABSTRACT

Soluble matrix technique whereby strands of wire are held in a fixed position of any desired configuration for soldering or other processing, following which the matrix is removed by the application of solvent.

4 Claims, 5 Drawing Figures

METHOD OF EMPLOYING A SOLUBLE MATRIX TO MAINTAIN A PLURALITY OF OBJECTS IN A FIXED RELATIONSHIP

SUMMARY OF THE INVENTION

This invention discloses a means and method for easing the many manufacturing processes which deal with parallel strands of wire, often in great number, which must be retained in fixed relationship to one another throughout manufacture, but should not be allowed to cross, get mixed up, etc. This technique is especially useful where the parallel wires must appear in a loose, flexible condition after their terminals have been mounted, as with wire strands leading to the flying heads in computer disc memories.

The general object of this invention is to provide for temporarily holding wires or any other items in fixed relationship to one another, using a holding medium that is easily and thoroughly removable after the need therefor has passed. In the achievement of this and other objects and as a feature of this invention, there is provided a matrix for temporarily holding objects in fixed relationship comprising a sheet of soluble material in which the objects are embedded or to which they are affixed. Preferred examples of such a soluble matrix are either polyvinyl alcohol, which may be dissolved by ordinary water, or acetate film, which may be dissolved using acetone as the solvent.

Another feature of the invention is the process whereby the soluble matrix concept is utilized for manufacturing assembly or other handling of objects held in fixed relation to one another, comprising first laying down and holding the objects, such as wires or other components of an assembly on a smooth surface, in the relative positions desired to be maintained, next brushing on a continuous film of the soluble material which, upon hardening, is to form the matrix, next performing the operations for which the matrix was imposed upon the objects, and finally washing away the soluble matrix material with the appropriate solvent. As another feature of the invention, the objects to be matrixed can be affixed to the soluble material as an alternative to a solid surface of solvent, preferably by "gluing" with more of the same solvent or spraying with a covering layer thereof.

Another feature of the invention is that if the surface on which the objects are laid is contoured with recesses and protrusions such that it will index and align the positions of the objects and the continuous film of soluble material is applied and allowed to harden, then the inventive process may be repeated over and over thereby producing required quantities of the objects held in the matrix for use in mass production of assemblies using these objects.

Another feature of the invention is that layers of objects, such as instrument gear trains and other parts, assembled in the soluble matrix in fixed relation to one another may be superimposed one over another, conceivably in conjunction with other objects not in a soluble matrix, in such a fashion that components of the layers intermesh from one layer to the next and become an assembly from which the soluble matrix material may be washed.

Other objects and features of this invention and a fuller understanding thereof may be had by referring to the following description and claims taken in conjunction with the accompanying drawings.

REFERENCE TO THE DRAWINGS

DETAILED DESCRIPTION

Figure 1:
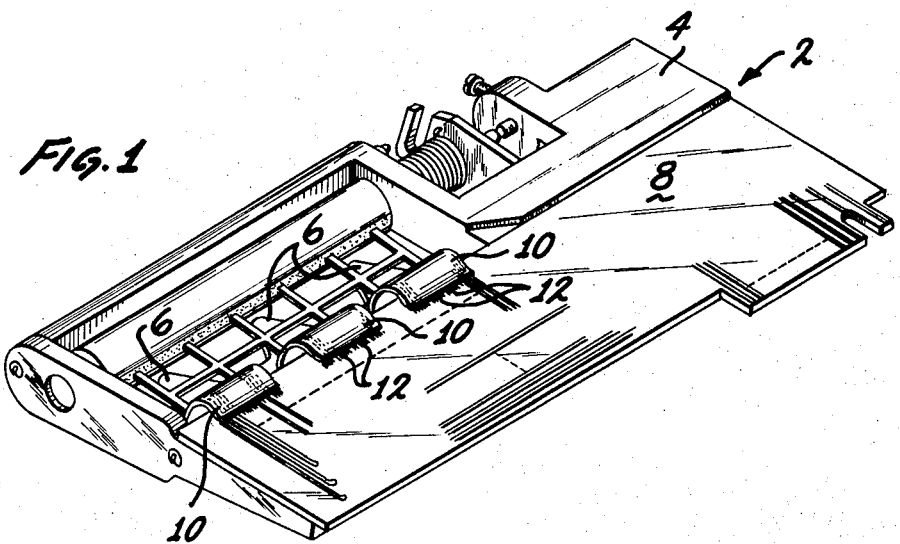
FIG. 1 is a perspective view in partial cut away of a flying head for computer disc memories, one application in which the instant invention has been found to be very useful.

Referring to the perspective view in FIG. 1, a flying head 2 as shown therein includes a main frame 4 upon which is mounted a series of heads 6 which are electrically connected to a small circuit board 8 via flexible insulated wires 10 which are soldered at one end to the heads 6 and at the other end to the circuit board 8. The reference 12 in FIG. 1 indicates the points where the wires 10 are soldered to the circuit board 8.

The utility of the instant invention lies in facilitating the installation of the wires 10 between the heads 6 and the circuit boards 8 for background. It is worth noting that the size of a flying head assembly 2 is about 4 ½ inches by 2 ½ inches, and that the number of wires 10 from each head 6 to the circuit board 8 is about 24.

Figure 2:
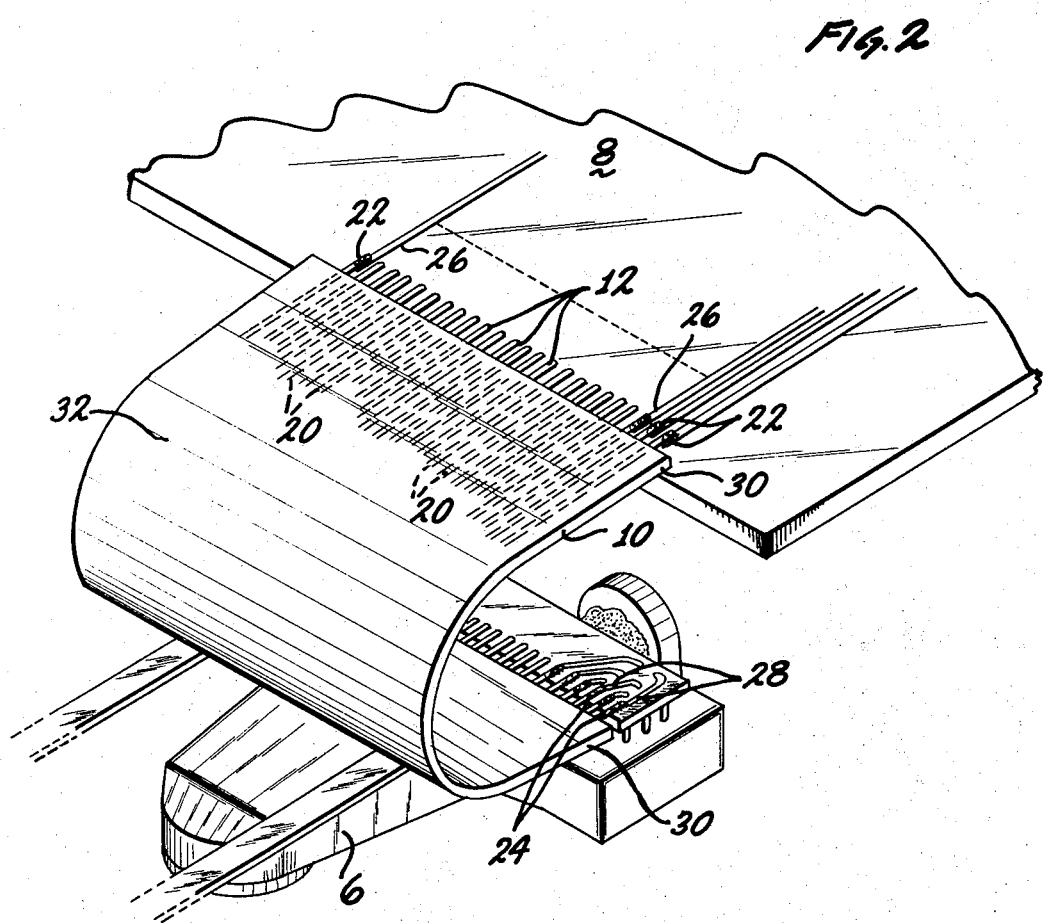
FIG. 2 is a detail perspective view of the magnetic head installation and electrical connections shown in FIG. 1, with the soluble matrix of the instant invention in use.

Referring to FIG. 2, which is an enlarged detailed view of very small portions of FIG. 1 (to wit: the wiring assembly between one flying head 6 and the circuit board 8), it can be seen that the large number of separate wires 20 would be very difficult to handle and very likely to become misarranged in the performance of soldering of the described ends 22 and 24 to the leads 26 of the circuit board 6 and to the electrical connections 28 associated with the flying head 6. Since the flying head 6 is flexibly affixed to the head assembly 2, there is no possibility of a plated or other type of inflexible connection between the head 6 and the circuit board 8. It is considered best engineering design that the individual wires 20 be soldered to the points 26 and 28 with a loosely flexible amount of wire 20 passing between. Accordingly, the manufacturing process of soldering the wire assembly 10 into place was a costly, painstaking, and error-prone operation at best. For, if two of the individual wires 20 crossed after they had been soldered at one end 22 or 24, and before they had been soldered at the other end, the electrical signals returned from the head 6 to the circuit board 8 would be erroneous. On the other hand, once both ends 22 and 24 have been completely soldered, the wires 10 must be left free to flex a certain amount when the head 6 is in operation flying over information discs.

Thus, according to this invention, the wires 20 are embedded in a soluble matrix 30 prior to the soldering operation. Naturally, the ends 22 and 24 are left free for soldering, outside of the matrix 30. After the wires 20 have been embedded in the matrix 30, they may be packaged, stored, distributed, and handled in the installation process as one entity 32 having a number of protrusions 22 – 24, rather than the previous assortment of separate wires 20 which had to be maintained in proper relationship or order, until such time as they were finally soldered at 26 and 28.

In the practice of the instant invention, it has been found that the best material for forming the matrix 30 about the wire 20 is polyvinyl alcohol, which can be washed free from the wires 20 after installation is completed, using mere water as a solvent. In the alternative the matrix 30 may be composed of an acetate film, the solvent for which is acetone.

As another feature of this invention, therefore, Applicant has provided a process for facilitating the installation of wires 20 (or any other objects which must be temporarily held in a fixed relationship to one another) using a soluble matrix 30, said process having the following steps: first, the objects such as the wires 20 must be laid out in the relationship to which they are to be affixed by the matrix 30. In the case of a large series of wires such as is shown in FIG. 2 at 20, the preferred way of laying out the wires is by the use of a mandrel which can hold them properly spaced and even stretched to eliminate kinks and curves, until the soluble matrix 30 has been imposed thereon and is hardened to the point where it is performing holding function.

Once the step of arranging the objects to be held by the matrix in proper relationship has been performed, the matrix itself is imposed by one of two alternative methods, either of which may be considered as an important feature of this invention, to wit: either application of soluble material in the liquid state to the objects in their fixed relationship (preferably, brushing), or by affixing the objects to one surface of soluble material in the solid state, using affixing material, (e.g., glue) which is also soluble, preferably by the same solvent.

Figure 3:
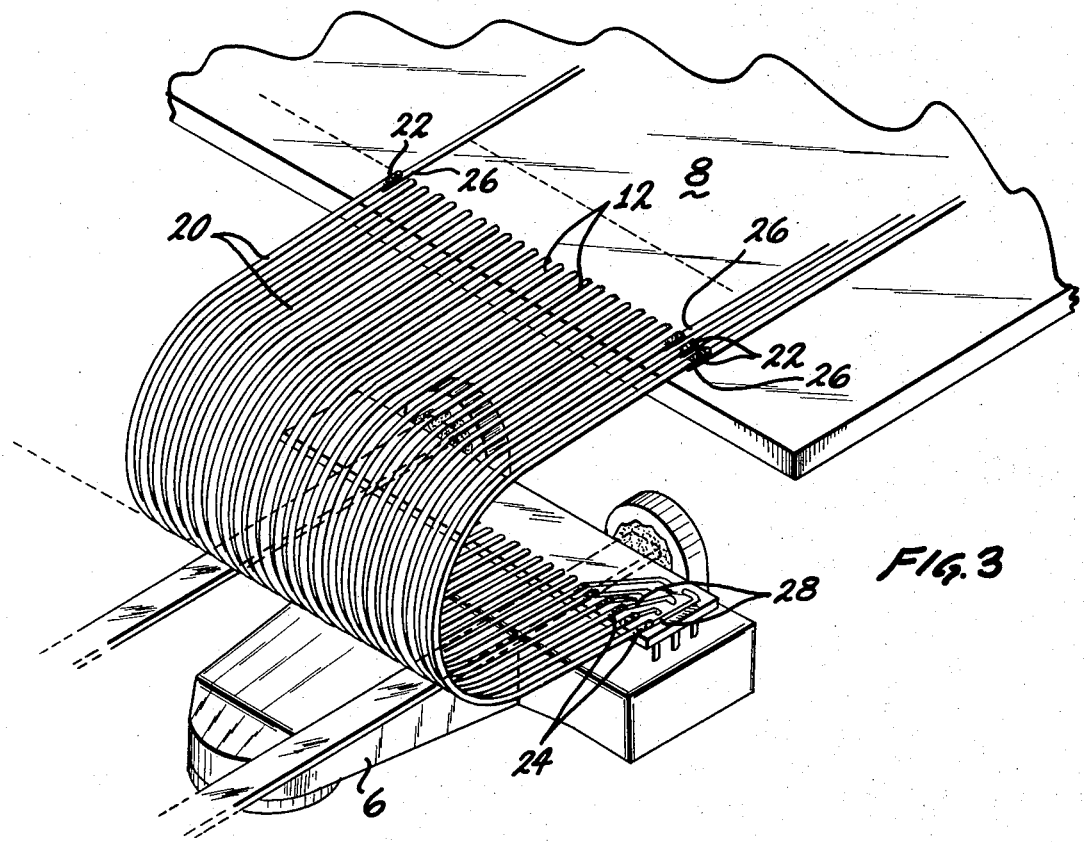
FIG. 3 is a perspective view identical to that of FIG. 2, with the exception that the soluble matrix disclosed herein has been dissolved and washed away.
Figure 4:
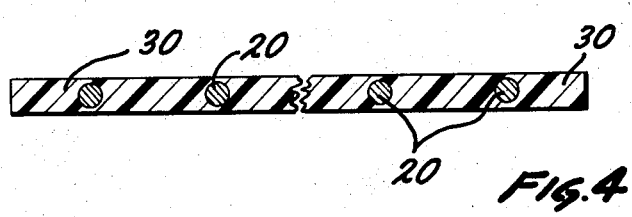
FIG. 4 is an end view along the section lines 2—2 of FIG. 2 showing the soluble matrix of FIG. 2.

Following the imposition of the soluble matrix 30 upon the wires 20, the unified entity 32 created thereby is used in whatever manner necessary of desirable, typically — storage for a period followed by installation as shown in FIG. 2. Once installation has finished, the final step according to this invention is the washing away of the matrix 30 from the wires 20 using the proper solvent called for by the soluble material of which the matrix is composed. The result is that the wires 20 are left free and unencumbered in any manner as shown in FIG. 3, just as if the matrix 30 had never been present. On the other hand, the ease of handling and the certainty of proper arrangement of ends 22 and 24 can be easily observed. Referring to FIG. 4, the end view shown therein is a section along the lines 2—2 in FIG. 2 of the soluble matrix 30 of FIG. 2 with the wires 20 embedded therein. The soluble matrix as it appears in FIG. 4 would be one that was imposed upon the wires 20 by the first alternative method disclosed above of arranging the wires 20 in the desired relationship and then applying the soluble material in its liquid state upon hardening, a solid body 30 would be the result. If either the polyvinyl alcohol or the acetate film discussed above is used to make the matrix 30, the combination of the wires 20 and the matrix 30 will be highly flexible entity 32.

Figure 5:
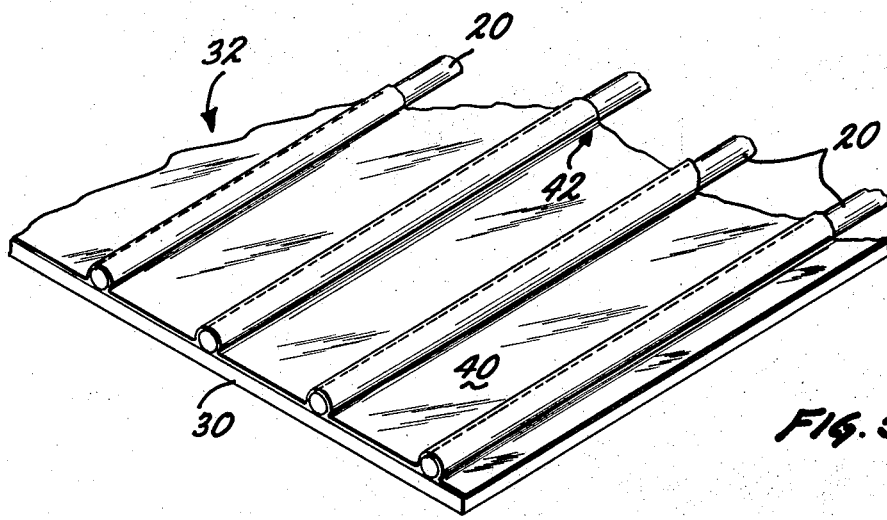
FIG. 5 is a perspective view of a detailed portion of a soluble matrix for wires according to an alternative feature of this invention.

Referring to FIG. 5, the small portion of a soluble matrix shown there is one according to the second alternative method of practicing this invention whereby the wires 20 are laid out upon the surface 40 of the soluble matrix 30 and then liquid soluble material 42 is applied over the wires 20 to affix them to the surface 40. Either this method or the method described in connection with FIG. 4 is equally useful as a step in applicant's invention, depending only upon what seems preferable for each specific situation where the invention is being practiced.

Thus, there has been described a soluble matrix and a method for the use thereof whereby the storage and processing of a number of objects, such as the wires 20, has been made much easier and accurate by the inventive technique of holding the objects in a matrix such as that shown in 30 of FIGS. 2, 4, and 5 to form a single entity 32 to replace the vast multitude of separate entities 20 for so long as the single entity 32 is considered desirable. The inventive matrix 30 has the feature that is composed of soluble material which can be washed away using the proper solvent as shown in FIG. 3 to leave the objects free once more, as is often necessary in various manufacturing techniques. Although this invention has been described in its preferred form with the details necessary to practice its features in this preferred form, the full scope of the protection to which the inventive concept is entitled should not be limited to the preferred embodiments described above but should be as broad as is requested in the claims which are set forth immediately below.

What is claimed is:

1. A process for maintaining a plurality of objects in a fixed relationship to one another for the performance of a desired operation, said process comprising:
   a. arranging said objects with respect to each other in fixed relationship;
   b. applying a soluble material to said arranged objects, said material having the characteristic of solidifying under the conditions under which said desired operation is to be performed, said material and objects forming a soluble matrix in which said objects are retained in said fixed relationship;
   c. assembling said matrix in a permanent fixed relationship to one another;
   d. performing said desired operation upon said matrix to permanently secure said objects in said permanent fixed relationship; and
   e. dissolving said soluble matrix to remove all of said soluble material therefrom whereby said objects remain in said permanent fixed relationship.

2. The process of claim 1 wherein step *b*) is performed by embedding said objects in said soluble material when said soluble material is in a liquid state.

3. The process of claim 1 wherein in step *b*) said objects are affixed to the surface of said soluble material.

4. The process of claim 3 wherein said objects are affixed to the surface of said soluble material is with a soluble affixing material.

* * * * *